US012687340B2

(12) United States Patent
Linneen

(10) Patent No.: US 12,687,340 B2
(45) Date of Patent: Jul. 21, 2026

(54) DRIVE SHAFT ASSEMBLY FOR A ROTARY FURNACE

(71) Applicant: X-energy, LLC, Rockville, MD (US)

(72) Inventor: Nicholas Linneen, Rockville, MD (US)

(73) Assignee: X-energy, LLC, Rockville, MD (US)

( * ) Notice: Subject to any disclaimer, the term of this patent is extended or adjusted under 35 U.S.C. 154(b) by 558 days.

(21) Appl. No.: 18/142,275

(22) Filed: May 2, 2023

(65) Prior Publication Data

US 2024/0369302 A1     Nov. 7, 2024

(51) Int. Cl.
| | |
|---|---|
| *F27B 7/26* | (2006.01) |
| *C21B 13/08* | (2006.01) |
| *F16C 3/02* | (2006.01) |
| *F27B 7/36* | (2006.01) |
| *F27D 1/18* | (2006.01) |
| *F27D 99/00* | (2010.01) |

(52) U.S. Cl.
CPC ................ *F27B 7/26* (2013.01); *F16C 3/023* (2013.01); *F27D 1/1808* (2013.01); *C21B 13/08* (2013.01); *F16C 2204/42* (2013.01); *F16C 2204/46* (2013.01); *F16C 2226/60* (2013.01); *F16C 2362/40* (2013.01); *F27B 2007/365* (2013.01); *F27D 2099/0083* (2013.01); *F27D 2099/0098* (2013.01)

(58) Field of Classification Search
CPC ...... F27B 7/26; F27B 2007/365; F16C 3/023; F16C 2204/42; F16C 2204/46; F16C 2226/60; F16C 2362/40; C21B 13/08; F27D 2099/0083; F27D 2099/0098
See application file for complete search history.

(56) References Cited

FOREIGN PATENT DOCUMENTS

| | | | | |
|---|---|---|---|---|
| CN | 204676136 U | | 9/2015 | |
| CN | 111473642 A | * | 7/2020 | ................ F27B 7/34 |
| CN | 212286542 U | * | 1/2021 | |
| CN | 115808079 A | | 3/2023 | |

OTHER PUBLICATIONS

CN-111473642-A translation (Year: 2025).*
CN-212286542-U translation (Year: 2025).*
Extended European Search Report issued in European application No. 241736362, dated Sep. 23, 2024, 8 pages.

* cited by examiner

*Primary Examiner* — Michael G Hoang
*Assistant Examiner* — Kurt J Wolford
(74) *Attorney, Agent, or Firm* — Crowell & Moring LLP

(57) ABSTRACT

The present disclosure is directed to drive shaft assemblies for a rotary furnace. In one form, a rotary furnace comprises a crucible and a drive shaft assembly. The drive shaft assembly comprises a primary shaft and a secondary shaft coupled with the primary shaft. The secondary shaft comprises: a first portion comprising a refractory alloy, the first portion defining a first end and a second end, where the first end of the first portion is configured to couple with the primary shaft; and a second portion comprising graphite, the second portion defining a first end and a second end, where the first end of the second portion is configured to couple with the second end of the first portion and the second end of the second portion is configured to couple with the crucible.

16 Claims, 6 Drawing Sheets

FIG. 3A
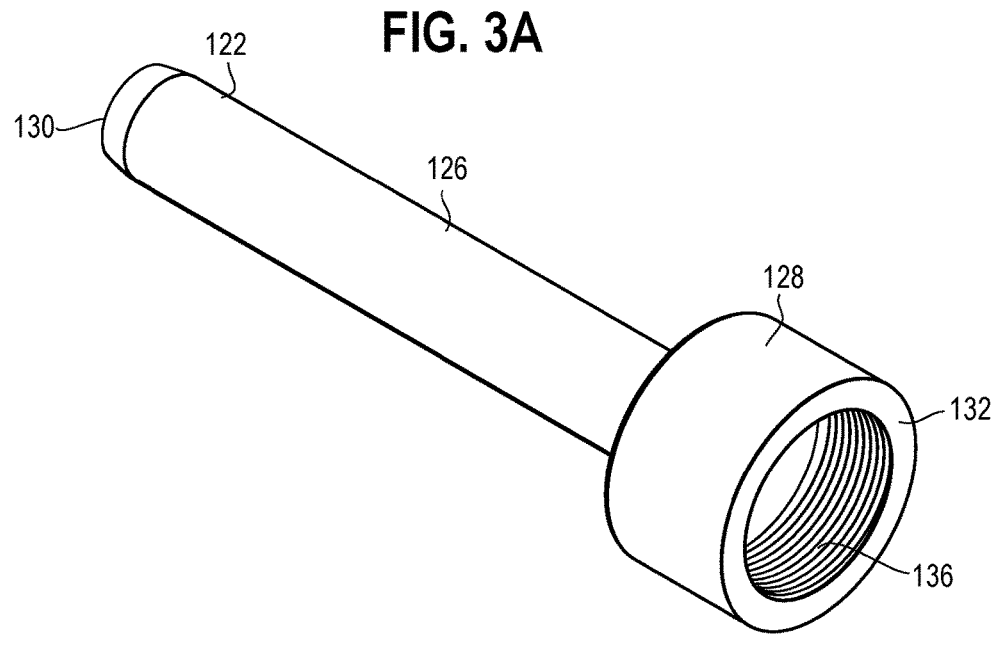
FIG. 3B
FIG. 3D
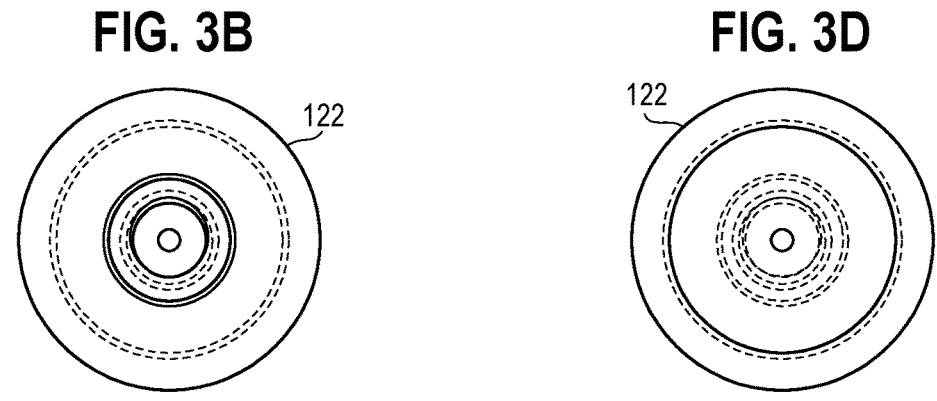
FIG. 3C

FIG. 4A
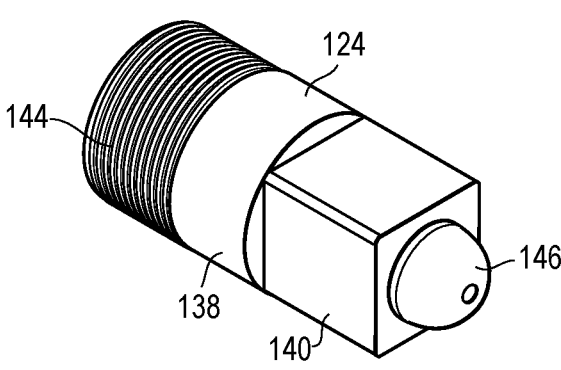
FIG. 4B
FIG. 4D
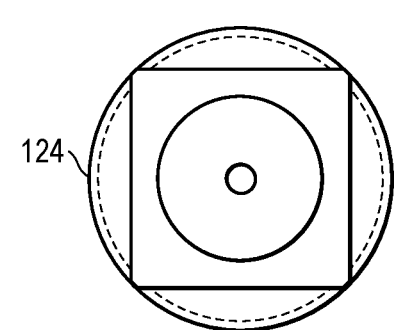
FIG. 4C
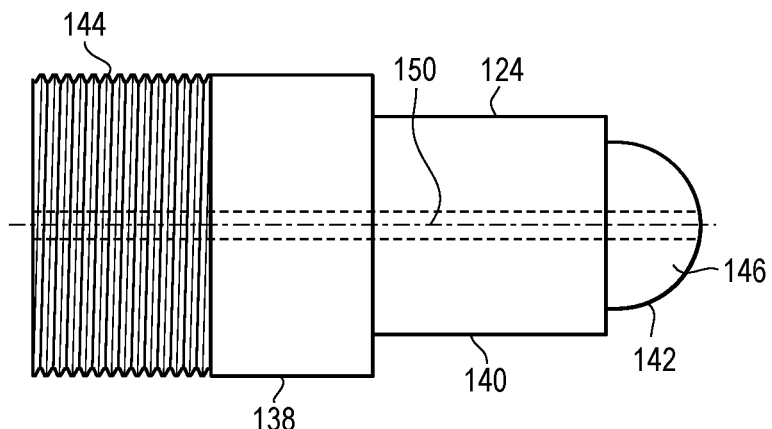

DRIVE SHAFT ASSEMBLY FOR A ROTARY FURNACE

BACKGROUND OF THE DISCLOSURE

Rotary furnaces are devices used to raise materials to a high temperature in a continuous mixing process. Rotary furnaces include a cylindrical vessel, such as a crucible, that may or may not be inclined from a horizontal state. During operation, the crucible is loaded with a material, heated, and rotated around its longitudinal axis. When a rotary furnace is utilized for the conversion of uranium ceramic fuels, problems can arise with the drive train that rotates the crucible. Due to the torque from the weight of a crucible that is loaded with uranium ceramic fuels, a drive shaft of the drive train in conventional high temperature rotary furnaces regularly break.

SUMMARY OF THE DISCLOSURE

The present disclosure addresses the problem described above and provides a two-piece secondary drive shaft that is strong enough to rotate a crucible loaded with uranium ceramic fuels without breaking.

In one aspect, the present disclosure provides a drive shaft for a rotary furnace. In some implementations, a drive shaft for a rotary furnace comprises a secondary shaft comprising a first portion and a second portion. The first portion of the secondary shaft comprises a refractory alloy, where the first portion defines a first end and a second end, where the first end of the first portion is configured to couple with a primary shaft of the drive shaft assembly of the rotary furnace. The second portion of the secondary shaft comprises graphite, where the second portion defines a first end and a second end, where the first end of the second portion is configured to couple with the second end of the first portion and the second end of the second portion is configured to couple with a crucible of the rotary furnace.

In some implementations, the refractory alloy of the first portion is one of tungsten, tantalum, molybdenum, titanium-zirconium-molybdenum, hafnium, or niobium.

In some implementations, the second portion of the secondary shaft defines: a cylindrical portion; a rectangular portion adjacent to the cylindrical portion; and a rounded portion adjacent to the rectangular portion.

In some implementations, the first portion of the secondary shaft defines an air passageway and the second portion of the secondary shaft defines an air passageway; wherein when the first portion of the secondary shaft is coupled with the second portion of the secondary shaft, the air passageway of the first portion is in communication with the air passageway of the second portion such that at least gas may flow through the secondary shaft; and wherein an inner diameter of the air passageway of the first second and the air passageway of the second portion is at least three inches.

In another aspect, the present disclosure provides a rotary furnace. In some implementations, the rotary furnace comprises: a crucible and a drive shaft assembly. The drive shaft assembly comprises a primary shaft and a secondary shaft coupled with the primary shaft. The secondary shaft comprises a first portion comprising a refractory alloy, the first portion defining a first end and a second end, where the first end of the first portion is configured to couple with the primary shaft. The secondary shaft further comprises a second portion comprising graphite, the second portion defines a first end and a second end, where the first end of the second portion is configured to couple with the second end of the first portion and the second end of the second portion is configured to couple with the crucible.

In some implementations, the refractory alloy is one of tungsten, tantalum, molybdenum, titanium-zirconium-molybdenum, hafnium, or niobium.

In some implementations, the second portion of the secondary shaft defines: a rounded portion positioned at a distal end of the second end of the second portion, wherein the rounded portion is configured to form a seal with a first end of the crucible when the crucible receives at least a portion of the second end of the second portion of the secondary shaft; and a rectangular portion adjacent to the rounded portion, wherein the rectangular portion is configured to engage a complementary shaped aperture at the first end of the crucible when the crucible receives at least a portion of the second end of the second portion of the secondary shaft.

In some implementations, the first portion of the secondary drive shaft defines an air passageway and the second portion of the secondary drive shaft defines an air passageway, where when the first portion of the secondary drive shaft is coupled with the second portion of the secondary drive shaft, the air passageway of the first portion is in communication with the air passageway of the second portion such that at least gas may flow through the secondary drive shaft; and where an inner diameter of the air passageway of the first second and the air passageway of the second portion is at least three inches.

In some implementations, when the secondary shaft is coupled with the crucible, gas flows from at least one of: from the air passageway of the first portion of the secondary shaft, into the air passageway of the second portion of the secondary shaft, and into an interior of the crucible; or from the interior of the crucible, into the air passageway of the second portion of the secondary shaft, and into the air passageway of the first portion of the secondary shaft.

In some implementations, the rotary furnace further comprises a second drive shaft assembly comprising a second primary shaft and a second secondary shaft coupled with the second primary shaft.

The second secondary shaft comprises: a first portion comprising a refractory alloy, the first portion defining a first end and a second end, where the first end of the first portion is configured to couple with the second primary drive shaft; and a second portion comprising graphite, the second portion defining a first end and a second end, where the first end of the second portion is configured to couple with the second end of the first portion of the second secondary shaft and the second end of the second portion is configured to couple with the crucible; wherein the second end of the secondary shaft couples with a first end of the crucible and the second end of the second secondary shaft couples with a second end of the crucible.

BRIEF DESCRIPTION OF THE DRAWINGS

FIG. 3a is a perspective view of a first portion of a secondary shaft;

FIG. 3b is a rear view of the first portion of the secondary shaft;

FIG. 3c is a cross-sectional side view of the first portion of the secondary shaft;

FIG. 3d is a front view of the first portion of the secondary shaft;

FIG. 4a is a perspective view of a second portion of a secondary shaft;

FIG. 4b is a rear view of the second portion of the secondary shaft;

FIG. 4c is a cross-sectional side view of second portion of the secondary shaft;

FIG. 4d is a front view of the second portion of the secondary shaft; and

DETAILED DESCRIPTION

The present disclosure is directed to a drive shaft assembly for a rotary furnace. To address the problems discussed above with draft shaft assemblies breaking when rotating a crucible loaded with uranium ceramic fuels, implementations of drive shaft assemblies disclosed in the present disclosure utilize secondary shafts comprising at least two portions. A first portion comprises a first material that strengthens the drive shaft while a second portion comprises a second material that provides for simplified loading and unloading of the crucible. Additionally, implementations of drive shaft assemblies disclosed in the present disclosure provide improved air passageways that reduce clogging when converting uranium ceramic fuels.

Figure 1:
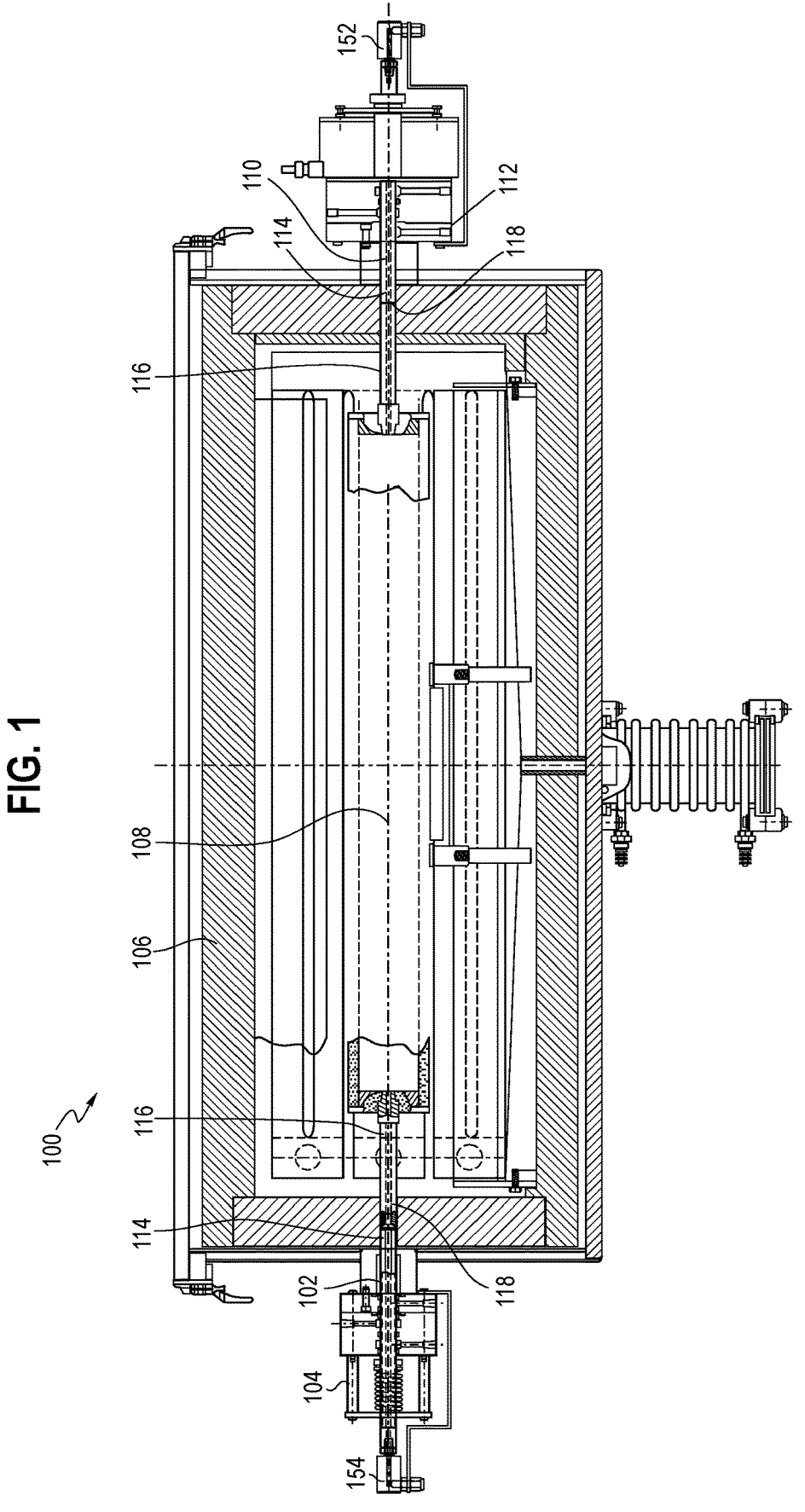
FIG. 1 is a cross-sectional side view of a rotary furnace.

FIG. 1 is a cross-sectional side view of a rotary furnace 100. In some implementations, a rotary furnace 100 includes a first drive shaft assembly 102, a retraction spring loader 104, a hot zone furnace 106, a crucible 108, a second drive shaft assembly 110, and a drive motor 112.

The retraction spring loader 104 is coupled with the first drive shaft assembly 102 and is configured to retract the first drive shaft assembly 102 from a position where the first drive shaft assembly 102 is engaged with a first end of the crucible 108 to a retracted position. The retraction spring loader 104 is further configured to move the first drive shaft assembly 102 from the retracted position back into a position where the first drive shaft assembly 102 is engaged with the first end of the crucible 108.

Similarly, the drive motor 112 is coupled with the second drive shaft assembly 110 and is configured to retract the second drive shaft assembly 110 from a position where the second drive shaft assembly 110 is engaged with a second end of the crucible 108 to a retracted position. The drive motor 112 is further configured to move the second drive shaft assembly 110 from the retracted position back into an original position where the second drive shaft assembly 110 is engaged with the second end of the crucible 108.

The drive motor 112 is further configured to rotate the second drive shaft assembly 110, which in turn rotates the crucible 108 coupled with the second drive shaft assembly 100 and rotates the first drive shaft assembly 102 coupled with the crucible 108.

During operation of the rotary furnace illustrated in FIG. 1, the crucible 108 is removed from the hot zone furnace 106 while the first and second drive assemblies 102, 110 are in a retracted position. The crucible 108 is loaded with material for conversion. In implementations such as those described in the present application dealing with the conversion of uranium ceramic fuels, the crucible 108 may be loaded with ammonium diuranate, uranium dioxide, uranium oxycarbide, uranium nitride, uranyl nitrate, U3O8, or mixed uranium oxides with graphite, for example.

Once the crucible 108 is loaded with material, the crucible 108 is placed within the hot zone furnace 106. Further, the first and second drive shaft assemblies 102, 110 are moved from their retracted positions to positions where the first drive shaft assembly 102 engages a first end of the crucible 108 and the second drive shaft assembly 110 engages a second end of the crucible 108.

As a program begins conversion of the material, the hot zone furnace 106 heats up, thereby heating the crucible 108. Additionally, the drive motor 112 slowly turns the second drive shaft assembly 110. The turning of the second drive shaft assembly 110 turns the crucible 108, which additionally turns the first drive shaft assembly 102.

Figure 2:
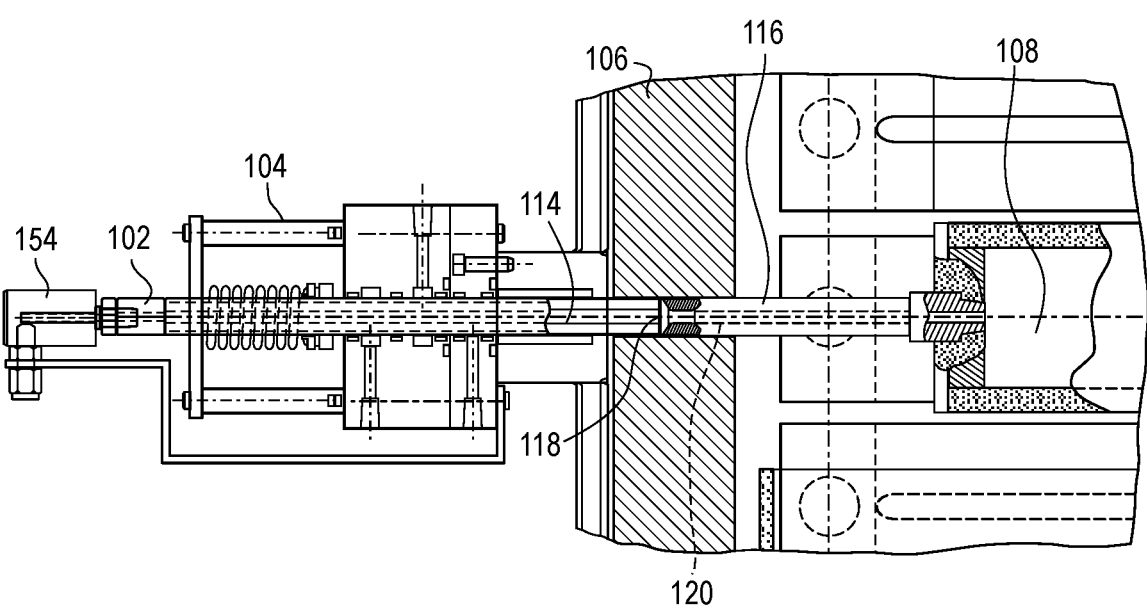
FIG. 2 is an enlarged view of a portion of a rotary furnace including a primary shaft, a secondary shaft, and one end of a crucible.

As discussed above, when a conventional rotary furnace is utilized for the conversion of uranium ceramic fuels, problems can arise with the drive train that rotates the crucible. Due to the weight of a crucible that is loaded with uranium ceramic fuels, a drive shaft of the drive train in conventional rotary furnaces regularly break. Drive shafts assemblies of rotary furnaces, such as the first and second drive shaft assemblies 102, 110 described above, may includes a primary shaft 114 that is coupled to a secondary shaft 116. In conventional rotary furnaces, the secondary shafts 116 are made of graphite. Referring to FIG. 2, when preforming a conversion of uranium ceramic fuels, the torque exerted from rotating the crucible 108 regularly causes a break at or near a connection point 118 between the primary shaft 114 and the secondary shaft 116 of the first and/or second drive shaft assemblies 102, 110 due to weakness of the graphite in the secondary shaft 116.

In addition to drive shaft assemblies breaking during operation, conventional rotary furnaces regularly encounter clogging issues when utilized in the conversion of uranium ceramic fuels. While the hot zone furnace 106 heats the crucible 108 and the drive motor 112 turns the crucible 108 during conversion, gas flows from an air passageway of the second drive shaft assembly 110, into an interior of the crucible 108, and then into an air passageway of the first drive shaft assembly 102. The clogging issues typically occur in the first draft shaft assembly 102, and more specifically at a point 120 in the secondary shaft 116, adjacent to a connection with the primary shaft 114 due to cooling in the secondary shaft 116 away from the hot zone furnace 106.

In the conversion of uranium ceramic fuels, gas is utilized to oxidize, reduce, and/or convert the uranium ceramic into various oxides, nitrides, and carbides. Gases used for the conversion of uranium ceramic fuels may include, for example, carbon monoxide, nitrogen, carbon dioxide, hydrogen, and ammonia.

To address the issues of breaking drive shaft assemblies and clogging of air passageways within drive shaft assemblies when a rotary furnace is utilized to convert uranium ceramic fuels, the present disclosure provides drive shaft assemblies 102, 110 for a rotary furnace where the secondary shaft 116 of the drive shaft assemblies 102, 110 comprises two portions that comprise different material, where the secondary shaft 116 of the drive shaft assemblies 102, 110 also include interior air passageways that are large enough to reduce clogging.

FIGS. 3a-3d are drawings illustrating a first portion 122 of a secondary shaft 116 of a drive shaft assembly; FIGS.

Figure 5A:
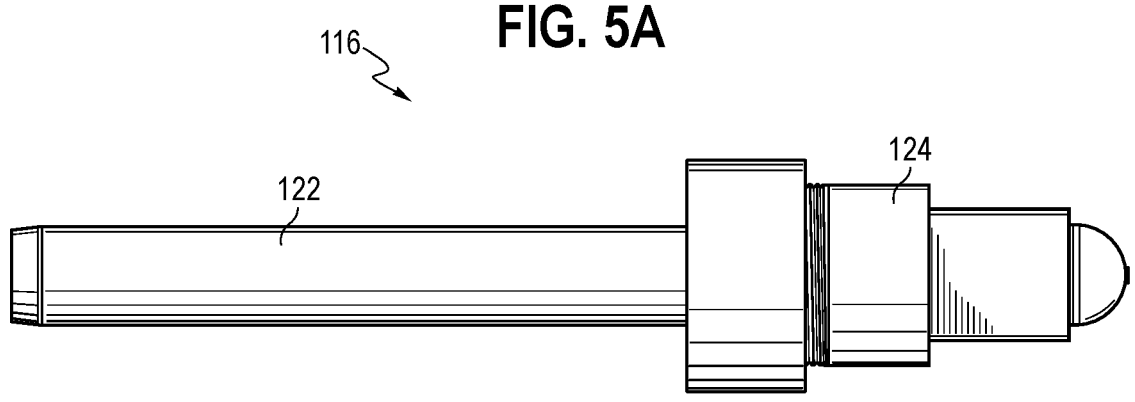
FIG. 5a is a side view of a first portion of a secondary shaft of a drive shaft assembly coupled with a second portion of the secondary shaft of the drive shaft assembly
Figure 5B:
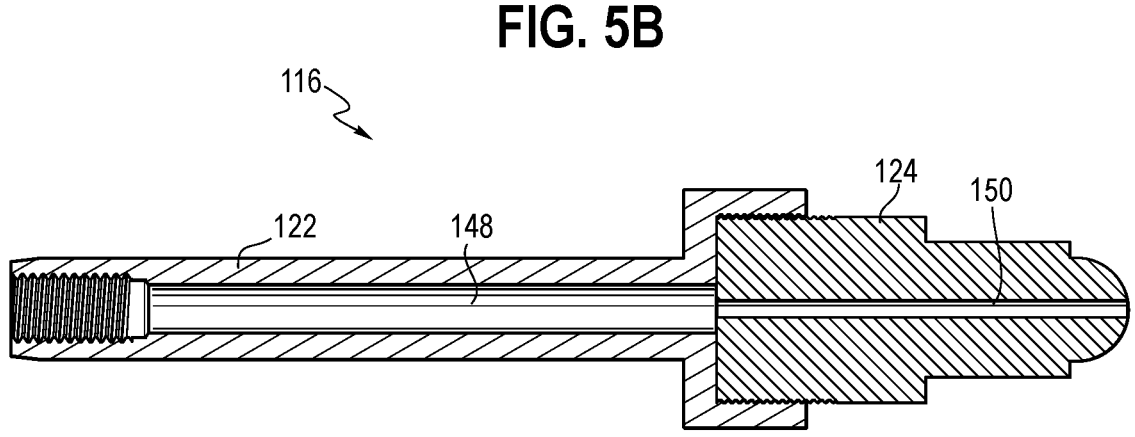
FIG. 5b is a cross-sectional view of a first portion of a secondary shaft of a drive shaft assembly coupled with a second portion of the secondary shaft of the drive shaft assembly.

4a-4d are drawings illustrating a second portion 124 of a secondary drive shaft of a drive shaft assembly; and FIG. 5 is a perspective view of the first portion 122 of the secondary shaft 116 coupled with the second portion 124 of the secondary shaft 116.

Referring to FIGS. 3a-3d, a body of the first portion 122 of the secondary shaft 116 of a drive shaft assembly is generally shaped as an elongated cylinder 126 connected to a larger cylinder 128. A first end 130 of the first portion 122 of the secondary shaft 116 is configured to couple with an end of the primary shaft 114.

In some implementations the first end 130 of the first portion 122 may define an aperture 134 that is configured to receive an end of the primary shaft 114. In some implementations, a wall defining the aperture 134 may include threads that are configured to receive and engage complementary threads positioned on an exterior of at least part of the primary shaft 114.

Figure 3E:
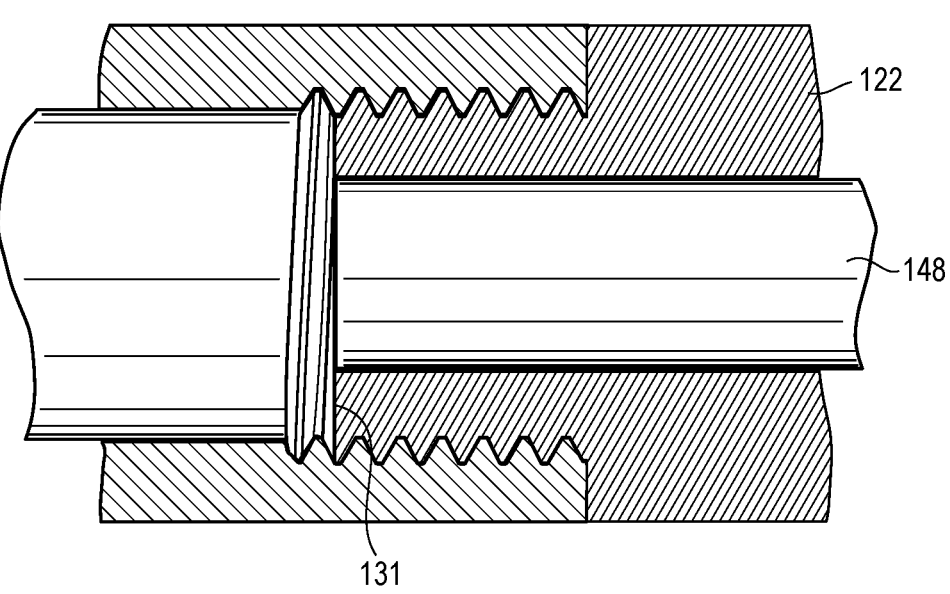
FIG. 3e is an enlarged view of a connection between a primary shaft and a first portion of the secondary shaft showing a structure to prevent liquid from entering the secondary shaft from the primary shaft.

In other implementations, the primary shaft 114 defines an aperture that is configured to receive the first end 130 of the first portion 122 of the secondary shaft 116, as shown in FIG. 3e. In some implementations, a wall defining the aperture of the primary shaft 114 may define threads that are configured to receive and engage with complementary threads defined on an exterior of the first end 130 of the first portion 122 of the secondary shaft 116. In some implementations of this configuration, the first portion 122 of the secondary shaft defines a structure such as a lip 131 that is positioned that prevents water condensate from the primary shaft 114, which is often water cooled, from migrating into the secondary shaft 116 and the hot zone furnace 106.

A second end 132 of the first portion 122 of the secondary shaft is configured to couple the second portion 124 of the secondary shaft 116. The larger cylinder 128 of the first portion defines a cylindrical aperture 136 that defines a region sized to complement at least a portion of an end of the second portion 124 of the secondary shaft 116 when it is received. In some implementations, a wall defining the cylindrical aperture 136 may include threads that are configured to receive and engage complementary threads positioned on an exterior of at least part of the second portion 124 of the secondary shaft.

To strengthen the secondary shaft 116 of the drive assemblies 102, 110, the first portion 122 and the second portion 124 of the secondary shaft 116 comprise different materials. In some implementations, the first portion 122 of the secondary shaft 116 comprises a refractory alloy such as tungsten, tantalum, molybdenum, or titanium-zirconium-molybdenum (TZM). One of skill in the art will appreciate that these refractory alloys often do not embrittle, and those that do, are thick enough to avoid breakage, or significantly oxidize as the secondary shaft 116 of the drive assemblies 102, 100 are heated by the hot zone furnace 106. In comparison to conventional secondary drive shafts 116 that comprise graphite, refractory alloys provide strength to the secondary shaft 116 and the ability to handle torque requirements to rotate the crucible 108.

Referring to FIGS. 4a-4d, a body of the second portion 124 of the secondary shaft 116 of a drive assembly shaft generally includes a cylindrically shaped portion 138 that is adjacent to a rectangular shaped portion 140, that is adjacent to a rounded end 142.

A first end 144 of the second portion 124 of the secondary shaft 116 that is cylindrical in shape is configured to couple with the second end 132 of the first portion 112 of the secondary shaft 116. As noted above, the first end 144 of the second portion 124 may be sized to complement the size of the aperture 136 of the second end 132 of the first portion 112 of the secondary shaft 116 when coupled together. Additionally, at least a portion of the exterior of the first end 144 of the second portion 124 may define threads that are configured to engage with threads on the wall of the aperture 136 of the second end of the first portion 124.

A second end 146 of the second portion 124 of the secondary shaft 116 is configured to couple with the crucible 108. In some implementations, the rectangular shaped portion 140 is configured to engage a complementary rectangular aperture defined at an end of the crucible 108. It will be appreciated that in other configurations, rather than a rectangle, other shapes could be used such as triangular, pentagonal, or hexagonal shapes, for example.

Additionally, the rounded end 142 of the second portion 124 of the secondary shaft 116 is configured to engage with a complementary shaped portion of at the end of the crucible 108 and form a seal with the end of the crucible.

The second portion 124 of the secondary shaft 116 comprises graphite. Graphite prevents the second portion 124 of the secondary shaft 116 from welding to the crucible 108 when the secondary shaft 116 and crucible 108 are heated and provides for ease of use when loading and unloading the crucible 108. Additionally, graphite provides an efficient seal when the second portion 124 of the secondary shaft 116 engages with the crucible 108 so that gasses may flow from an air passageway within the second drive shaft assembly 110, into an interior of the crucible 108, and then into an air passageway within the first drive shaft assembly 102, as described in more detail below.

The first portion 122 of the secondary shaft 116 includes at least one air passageway 148 extending the length of the first portion 122 that allows gas to flow through the first portion 122 (see FIGS. 3a-3d). Similarly, the second portion 124 of the secondary shaft 116 includes at least one air passageway 150 extending the length of the second portion 124 that allows gas to flow through the second portion 122 (See FIGS. 4a-4d).

The first portion 122 and the second portion 124 of the secondary shaft 116 are configured such that when the first and second portions 122, 124 are coupled together, the air passageway 148 of the first portion 122 is in communication with the air passageway 150 of the second portion (See FIG. 5). Accordingly, gas is able to flow through the first and second portions 122, 124 of the secondary shaft 116.

The secondary shaft 116 is further configured such that when the secondary shaft 116 is coupled with the primary shaft 114, the air passageways 148, 150 of the secondary shaft 116 are in communication with an air passageway of the primary shaft 114 such that gas is able to flow through the drive shaft assemblies 102, 110.

Similarly, the secondary shaft 116 is further configured such that when the second portion 124 of the secondary shaft 116 is coupled with the crucible 108, the air passageway 150 of the second portion 124 is in communication with an air passageway of the crucible 108 such that air may flow from the secondary shaft 116 and into an interior of the crucible 108 or air may flow from the interior of the crucible 108 and into the secondary shaft 116.

One of skill in the art will appreciate that in light of the above, when the first drive shaft assembly 102 is coupled with the crucible 108 and the second drive shaft assembly 110 is coupled with the crucible 108, an air flow path is provided through the rotary furnace 100. In particular, gas may enter at a gas inlet 152, flow through the air passageways of the second drive shaft assembly 110, flow through an interior of the crucible 108, flow through the air passage-ways of the first drive shaft assembly 112, and flow out of a gas outlet 154.

As noted above, during conversion of uranium ceramic fuels, clogging issues regularly occur in drive shaft assemblies of conventional rotary furnaces at point 120 in the secondary shaft 116 adjacent to a connection with the primary shaft 114. The clogging is due in large part to material depositing and clogging the air passageways in cooler parts of the secondary shaft away from the hot zone furnace 106. In the conversion of uranium ceramic fuels, the materials that deposits are often impurities, such as silicon, that evaporates from feedstock material during conversion. Other materials that may deposit and clog the air passage-way may include water, carbon, and resin by products from pyrolysis.

To address this issue, in some implementations, the air passageway 148 of the first portion 122 and the air passage-way 150 of the second portion 124 of the secondary shaft 116 is enlarged to allow for deposition of material while still maintaining gas flow. In some implementations, a diameter of the air passageways 148, 150 of the first and second portions 122, 124 of the secondary shaft 116 are at least three inches.

Forms of drive shaft assemblies for a rotary furnace are described above in conjunction with FIGS. 1-5 that address problems with draft shafts breaking when rotating a crucible loaded with uranium ceramic fuels. In some implementa-tions, drive shaft assemblies include a secondary shaft that includes two portions. In a first portion of the secondary shaft that is coupled with a primary shaft of the drive shaft assembly, a refractory alloy is utilized to increase the strength of the secondary shaft. In a second portion of the secondary shaft that is coupled with a crucible of the rotary furnace, graphite is us utilized to provide ease of use in loading and unloading the crucible. Additionally, air pas-sageways within the secondary shaft of the drive shaft assemblies described above are improved to reduce clogging when converting uranium ceramic fuels.

Although certain embodiments and implementations of the disclosure have been specifically described herein, it will be apparent to those skilled in the art to which the disclosure pertains that variations and modifications of the various embodiments shown and described herein may be made without departing from the spirit and scope of the disclosure. Accordingly, it is intended that the disclosure be limited only to the extent required by the appended claims and the applicable rules of law.

The invention claimed is:

1. A drive shaft assembly for a rotary furnace, comprising:
a secondary shaft comprising:
  a first portion comprising a refractory alloy, the first portion defining a first end and a second end, where the first end of the first portion is configured to couple with a primary shaft of the drive shaft assembly of the rotary furnace; and
  a second portion comprising graphite, the second por-tion defining a first end and a second end, where the first end of the second portion is configured to couple with the second end of the first portion and the second end of the second portion is configured to couple with a crucible of the rotary furnace;
  wherein the second portion defines:
    a cylindrical portion;
    a rectangular portion adjacent to the cylindrical portion; and
    a rounded portion adjacent to the rectangular portion.

2. The drive shaft assembly of claim 1, wherein the refractory alloy comprises is one of tungsten, tantalum, molybdenum, titanium-zirconium-molybdenum, hafnium, or niobium.

3. The drive shaft assembly of claim 1, wherein the first and second portions of the secondary shaft are threadably coupled with each other.

4. The drive shaft assembly of claim 3, wherein:
the second end of the first portion defines a cylindrical aperture, where at least a portion of an interior wall of the cylindrical aperture is threaded;
the first end of the second portion defines a cylindrical portion that is sized to be received by the cylindrical aperture of the second end of the first portion; and
at least a portion of an exterior of the cylindrical portion of the first end of the second portion is threaded, where threads of the interior wall of the cylindrical aperture of the first portion and threads of the exterior of the cylindrical portion of the second portion are configured to engage with each other when the first end of the second portion is received by the cylindrical aperture of the second end of the first portion.

5. The drive shaft assembly of claim 1, wherein:
the first portion of the secondary shaft defines an air passageway;
the second portion of the secondary shaft defines an air passageway;
when the first portion of the secondary shaft is coupled with the second portion of the secondary shaft, the air passageway of the first portion is in communication with the air passageway of the second portion such that at least gas may flow through the secondary shaft; and
an inner diameter of the air passageway of the first portion and the air passageway of the second portion is at least three inches.

6. The drive shaft assembly of claim 5, wherein:
when the secondary shaft is coupled with the primary shaft of the rotary furnace, the air passageway of the first portion of the secondary shaft is in communication with an air passageway of the primary shaft; and
the first portion of the secondary shaft defines a structure configured to prevent liquids from entering the second-ary shaft from the primary shaft.

7. A rotary furnace comprising:
a crucible;
a drive shaft assembly comprising:
  a primary shaft; and
  a secondary shaft coupled with the primary shaft, wherein the secondary shaft comprises:
    a first portion comprising a refractory alloy, the first portion defining a first end and a second end, where the first end of the first portion is configured to couple with the primary shaft; and
    a second portion comprising graphite, the second portion defining a first end and a second end, where the first end of the second portion is con-figured to couple with the second end of the first portion and the second end of the second portion is configured to couple with the crucible;
wherein the second portion of the secondary shaft defines:
  a rounded portion positioned at a distal end of the second end of the second portion, wherein the rounded portion is configured to form a seal with a first end of the crucible when the crucible receives at least a portion of the second end of the second portion of the secondary shaft; and a rectangular portion adjacent to the rounded portion, wherein the rectangular portion is configured to engage a complementary shaped aperture at the first end of the crucible when the crucible receives at least a portion of the second end of the second portion of the secondary shaft.

8. The Rotary Furnace of claim 7, wherein the refractory alloy comprises one of tungsten, tantalum, molybdenum, titanium-zirconium-molybdenum, hafnium, or niobium.

9. The rotary furnace of claim 7, wherein the first and second portions of the secondary shaft are threadably coupled with each other.

10. The rotary furnace of claim 9, wherein:

the second end of the first portion of the secondary shaft defines a cylindrical aperture, where at least a portion of an interior wall of the cylindrical aperture is threaded;

the first end of the second portion of the secondary shaft defines a cylindrical portion that is sized to be received by the cylindrical aperture of the second end of the first portion; and at least a portion of an exterior of the cylindrical portion of the first end of the second portion is threaded, where threads of the interior wall of the cylindrical aperture of the first portion and threads of the exterior of the cylindrical portion of the second portion are configured to engage with each other when the first end of the second portion is received by the cylindrical aperture of the second end of the first portion.

11. The rotary furnace of claim 7, further comprising:

a drive motor coupled with the primary shaft, where the drive motor is configured to rotate the primary shaft;

wherein rotation of the primary shaft causes the secondary shaft to rotate; and wherein rotation of the secondary shaft causes the crucible to rotate.

12. The rotatory furnace of claim 7, wherein:

rotation of the crucible causes the secondary shaft to rotate; and rotation of the secondary shaft causes the primary shaft to rotate.

13. The rotary furnace of claim 12, further comprising:

a retraction spring loader coupled with the primary shaft.

14. The rotary furnace of claim 7, wherein:

the first portion of the secondary shaft defines an air passageway;

the second portion of the secondary shaft defines an air passageway;

when the first portion of the secondary shaft is coupled with the second portion of the secondary shaft, the air passageway of the first portion is in communication with the air passageway of the second portion such that at least gas may flow through the secondary shaft; and wherein an inner diameter of the air passageway of the first second and the air passageway of the second portion is at least three inches.

15. The rotary furnace of claim 14, wherein when the secondary shaft is coupled with the crucible, gas flows from at least one of:

from the air passageway of the first portion of the secondary shaft, into the air passageway of the second portion of the secondary shaft, and into an interior of the crucible; or from the interior of the crucible, into the air passageway of the second portion of the secondary shaft, and into the air passageway of the first portion of the secondary shaft.

16. The rotary furnace of claim 7, further comprising:

a second shaft assembly comprising:

a second primary shaft;

a second secondary shaft coupled with the second primary shaft, wherein the second secondary shaft comprises:

a first portion comprising a refractory alloy, the first portion defining a first end and a second end, where the first end of the first portion is configured to couple with the second primary shaft; and a second portion comprising graphite, the second portion defining a first end and a second end, where the first end of the second portion is configured to couple with the second end of the first portion of the second secondary shaft and the second end of the second portion is configured to couple with the crucible;

wherein the second end of the secondary shaft couples with a first end of the crucible and the second end of the second secondary shaft couples with a second end of the crucible.

* * * * *